INVENTORS
ROBERT E. DIENER
BY ANDREW A. SPISAK
Williams, David,
Hoffmann & Fount
ATTORNEYS

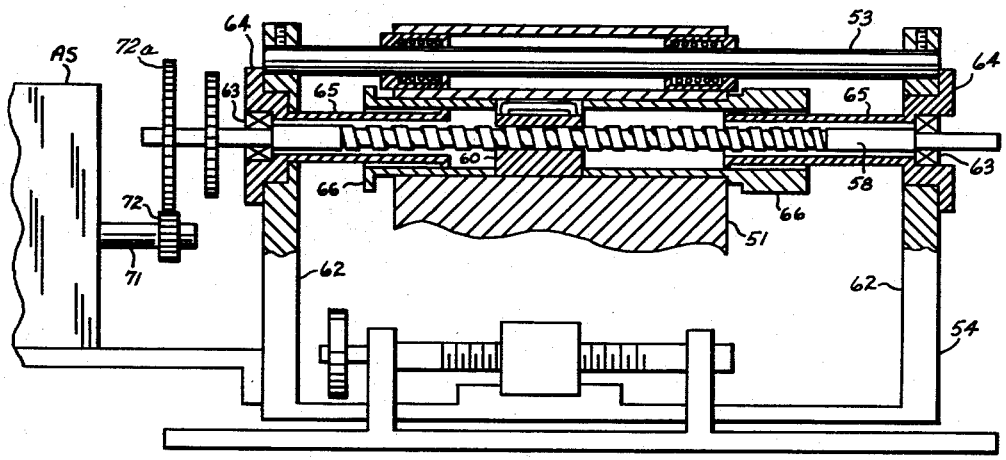
FIG. 2
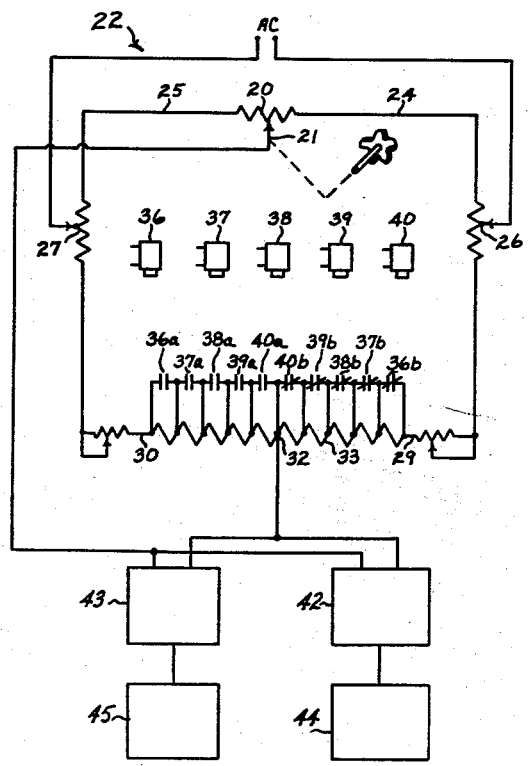
FIG. 4
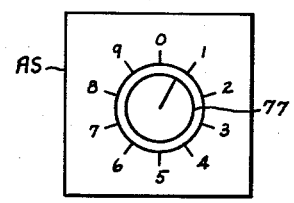
FIG. 3
FIG. 3A
INVENTORS
ROBERT E. DIENER
ANDREW A. SPISAK
BY
ATTORNEYS

United States Patent Office 3,190,153
Patented June 22, 1965

3,190,153
POSITIONING SYSTEM
Robert E. Diener, Shaker Heights, and Andrew A. Spisak, Cleveland, Ohio, assignors to The Warner & Swasey Company, Cleveland, Ohio, a corporation of Ohio
Filed May 3, 1963, Ser. No. 277,885
21 Claims. (Cl. 77—63)

The present invention relates to a positioning system for positioning a movable member such as a movable table or slide of a machine tool.

An important object of the present invention is to provide a new and improved system for positioning a movable member, such as a machine tool table, to a final destination which is offset from one of a plurality of predetermined coarse positions and in which a gauge member is caused to rotate to measure the movement of the movable member from a preselected one of the coarse positions to the final destination and to effect a stopping of the movable member at the final destination.

A further object of the present invention is to provide a new and an improved positioning system for positioning a movable member, such as a machine tool table or slide, to a final destination offset from one of a plurality of predetermined coarse positions in which a gauge member is rotated by a ball-type nut and lead screw mechanism which is connected to be driven from the movable member when the movable member arrives at a preselected coarse position.

A further object of the present invention is to provide a new and improved positioning mechanism wherein a main drive means effects movement of a movable member, such as a machine tool table or slide, to position the same at a destination and a gauge member is connectable to the movable member being positioned by the main drive means at any one of a plurality of predetermined coarse positions to effect movement of the gauge member with the movable member and wherein control means is actuated after a preselected movement of the gauge member equal to the offset of the final position from a preselected coarse position to stop the main drive means from moving the movable member.

It is a further object of the present invention to provide a new and an improved simplified gauging mechanism which is preset to measure the movement of a movable member from a coarse position and operable to stop the member at a destination position offset a predetermined distance from the coarse position in which the same setting may be made for the switch mechanism regardless of the direction of movement of the movable member to the position.

Further objects and advantages of the present invention will be apparent from the following detailed description of the preferred embodiment thereof made with reference to the accompanying drawings forming a part of the present specification for all subject matter disclosed therein and in which:

FIG. 2 is a cross-sectional view through a portion of FIG. 1;

FIG. 3 is a detailed view, somewhat schematic, of a portion of FIG. 1;

FIG. 3A is a view looking at the left-hand side of the switch mechanism shown in FIG. 1;

FIG. 4 is a circuit diagram of a part of the positioning mechanism; and

Figure 1:
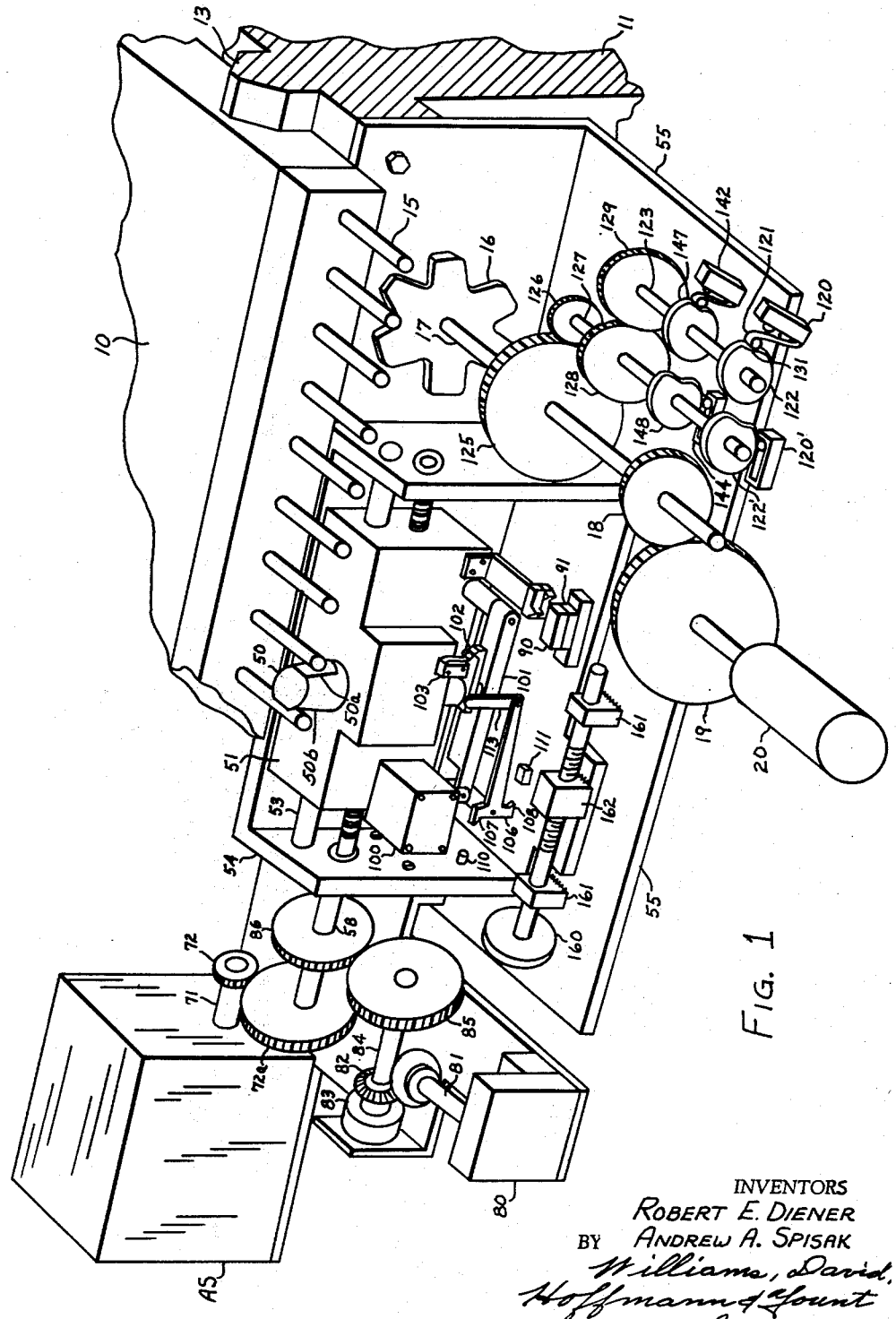
FIG. 1 is a perspective showing, somewhat diagrammatic, of a positioning mechanism embodying the present invention.

Referring to the drawings, a machine tool slide or table 10, supported on a bed 11, is adapted to be moved along the bed 11 by a main drive motor 12 (FIG. 5) connected to drive the table 10. The bed 11 has suitable ways 13 for guiding the movement of the table.

The motor 12 is adapted to be controlled by a positioning mechanism shown somewhat schematically in FIG. 1. The positioning mechanism includes a plurality of accurately shaped pegs 15 fixed to the side of the table 10 so as to extend outwardly therefrom in parallel relationship to each other along the line of movement of the table. A star wheel 16 meshes with the pegs 15 and is driven thereby as the table is moved along the bed 11. The star wheel is fixed to a rotatable shaft 17 which has a gear 18 fixed thereto and which is in mesh with a gear 19 for driving the movable tape 21 of a rotary potentiometer 20. The rotary potentiometer 20 forms the rebalancing resistance of a coarse positioning bridge 22. The coarse positioning bridge 22 has two legs 24, 25 connected between bridge energizing terminals 26, 27 with the potentiometer 20 being connected into the legs 24 and 25 and with the movable tap of the potentiometer constituting an output terminal of the bridge. The other legs of the bridge are identified by reference numerals 29, 30, respectively. The leg 29 is between the energizing terminal 26 and an output terminal 32 and the leg 30 is connected between the output terminal 32 and the energizing terminal 27. The legs 29 and 30 include a common resistance 33 which is center tapped to provide the output terminal 32 and corresponding sections of the resistance 33 on opposite sides of the center tap 32 can be selectively short-circuited or included in the leg of the bridge by energizing certain ones of relays 36, 37, 38, 39, 40. The relays have normally open contacts 36a . . . 40a connected across resistance sections on one side of the center tap 32 and normally closed contacts 36b . . . 40b for shorting corresponding sections on the other side of the center tap. When a relay is de-energized, a section of the resistance in the leg 29 shunted by the contacts of the relays is short-circuited while the corresponding section in the leg 30 is included in the bridge circuit. Energization of a relay short-circuits the respective section in leg 30 and inserts a corresponding section in the leg 29. By energizing selected combinations of the relays 36–40, a unique position of the tap 21 will be determined which corresponds to unique coarse positions of the table 10. Preferably, the coarse positions are located distances which are whole inches from a datum plane.

The output of the bridge 22 is applied to thyratron control circuits 42, 43 for controlling relays 44, 45 for operating the motor 12 in forward and reverse directions, respectively. The thyratron control circuits 42, 43 are sensitive to the polarity of unbalance of the bridge 22 and effect operation of the proper relay 44, 45 to move the table 10 in the proper direction to effect direct movement to the selected coarse position.

When the table 10 arrives at the proper coarse position, a pawl 50 is caused to project outwardly from a pawl carrier 51 supported adjacent the table 10 and to move between two adjacent pegs 15 so that the pawl and a peg will engage and cause the pawl carrier to move with the table. The pawl carrier 51 is supported for movement parallel to the direction of movement of the table 10 by a guide rod 53 supported in a frame 54 mounted on a support table 55 fixed to the bed of the machine. The pawl carrier 51 is supported on the guide rods by suitable bearings and the frame 54 is adjustable on the support plate 55 along a line parallel to the movement of the table 10 for reasons which will appear hereinafter.

Movement of the pawl carrier 51 with the table 10 effects rotation of a ball-type lead screw 58 extending parallel to the guide rod 53. The ball-type lead screw 58 is journaled in the frame 54 and extends through the pawl carrier 51 parallel to the guide rod 53 and cooperates with a ball-type nut 60 fixed in the pawl carrier 51.

As will be apparent by reference to FIG. 2, the lead screw 58 is rotatably supported in spaced stanchions 62 forming a part of the frame 54, the stanchions 62 also supporting the guide rod 53. The lead screw 58 is supported in the stanchions 62 by bearings 63 and 64 connected to the stanchions 62 by a member which has tubular portions 65 which receive the lead screw 54 and which extend inwardly from the stanchion 62 to be received in respective sleeve 66 fixed in the pawl carrier 51. The inner ends of the sleeves 66 abut the ball-type nut 60. As the pawl carrier 51 moves on the guide rod 53, the tubular portions 65 slide in the sleeve 66.

The rotation of the lead screw 58 as the pawl carrier 51 moves with the slide 10 causes rotation of a rotary gauge member 70 shown in FIG. 3. The rotary gauge member 70 is fixed to a shaft 71 which is geared to the lead screw 58 by a small gear 72 fixed to the shaft 71 which meshes with a larger gear 72a fixed to the lead screw 58. The rotary gauge member 70 is part of a switch mechanism AS which may be preset to effect a stopping of the motor 12 after the gauge member 70 has moved a predetermined distance. The switch mechanism AS includes a circular spider 73 on a shaft 76 and a gauge member 70 which has a brush that rotates against the spider. The spider 73 has contacts 74a, 74b which are contacted by the gauge member 70 when the latter is in respective predetermined angular positions with respect to the circular spider 73. The engagement of the gauge member 70 with the contact 74a or 74b is adapted to complete an electrical circuit to effect a stopping of the motor 12 with the contact 74a being effective when the motor is operating in one direction and the contact 74b being effective when the motor is operating in the other direction. The position of the circular spider 73 may be adjusted by rotating the shaft 76 with a knob 77 affixed thereto. By rotating the spider 73, the contacts 74a, 74b can be offset predetermined distances from the gauge member 70 and this will determine the movement of the pawl carrier 51 necessary before the motor 12 is stopped by engagement of gauge member 70 with the contact 74a or the contact 74b. The spider may be positioned by a servomotor if so desired.

Before a positioning movement of the table is started, the gauge member 70 and the pawl carrier 51 are always disposed in a predetermined position relative to the bed 11, the position corresponding to the "home" position of the carrier 51 where the pawl 50 will engage between a pair of adjacent pegs 15 when the table 10 is in any one of its predetermined coarse positions.

In the illustrated embodiment, the pawl carrier has a respective "home" position for each direction of movement with the positions being displaced from each other by one-half the increments between the pegs 15 on the table. After a positioning movement has been effected and the pawl carrier has been offset from its "home" position, a motor 80 is operated to return the pawl carrier 51 to a "home" position. The motor 80 has a shaft 81 which is connected by beveled gears 82 to drive the input element of a clutch 83 which is energizable to connect the motor shaft 81 to a countershaft 84. The countershaft 84 has a gear 85 thereon which meshes with a cooperating gear 86 on the lead screw 58. Consequently, operation of the motor 80 will, when the clutch 83 is engaged, effect rotation of the lead screw 85 to cause movement of the pawl carrier. The pawl carrier 51 is stopped at a "home" position by one of a pair of limit switches 90, 91 which when actuated stop the operation of the motor 80. When the pawl carrier is moving in one direction, the limit switch 90 is effective and, when moving in the other direction, the limit switch 91 is effective.

As is apparent from the foregoing description, the pawl 60 must be held in a retracted position, while the table 10 is being moved to a coarse position selected by the coarse bridge 22. The pawl 50 is mounted in the pawl carrier 51 for sliding movement and is biased downwardly out of engagement with the pegs 15. However, a solenoid 100 is fixed to the frame 54 and is energizable to project the pawl 50 outwardly into engagement with the pegs 15. Solenoid 100 is mounted vertically and has its lower end connected to a generally horizontal lever 101 pivoted to the pawl carrier 51 below the pawl 50 and, when the solenoid 100 is energized, the solenoid lifts the lever 101 to lift the bottom of the pawl 50 to project the pawl outwardly to engage with the pegs 15.

The lower end of the pawl 50 has a plate 102 fixed thereto for movement therewith and, when the solenoid 100 moves upwardly, as viewed in FIG. 1, the plate 102 moves upwardly to actuate the limit switches 103 to indicate that the solenoid is energized and that the pawl 50 is projected.

The pawl carrier 51 has limited movement in the frame 54 and to prevent the pawl carrier from being overdriven, a lever 106 is pivoted to the pawl carrier for movement about a generally horizontal axis and has upwardly and downwardly projecting arms 107, 108, respectively, which are adapted to engage blocks 110, 111, respectively, when the pawl carrier moves to the limit of its movement in a respective direction. Engagement of either arm 107, 108 with its respective block will cause rotation of the lever 106 in a clockwise direction about its axis, as viewed in FIG. 1, to cause the free end thereof to move downwardly. The free end of the lever 106 is pivoted to an arm 113 which is fixed to the plate 102 on the pawl 50. When the free end of the lever 106 moves downwardly as either one of the arms 107, 108 is carried into engagement with its corresponding stopblock, either 110 or 111, the pawl 50 will be retracted to disconnect the pawl carrier 51 from the pegs 15 so that continued movement of the table 10 will not damage the carrier.

When the table is moving in one direction, arbitrarily designated as the forward direction, the solenoid for projecting the pawl 50 is controlled by a switch 120 having a switch actuator 121 adapted to ride on a cam 122 rotated one revolution for each increment of the movement of table 10 corresponding to the distance between coarse positions. The cam 122 is fixed to a camshaft 123 which is rotated from the star wheel shaft 17. The star wheel shaft 17 has a gear 125 fixed thereto which meshes with a smaller gear 126 on a shaft 127, the shaft 127 having a gear 128 fixed thereto which meshes with a gear 129 fixed to the shaft 123. The gearing is such that the shaft 123 makes one complete revolution when the table moves an increment which corresponds to the increment between coarse positions. The cam 122 is shaped so that when the table 10 is at a coarse position, the actuator 121 is received in the recess 131 and the switch 120 has its contacts closed. When the switch actuator 121 is riding on the periphery of the cam out of the recess 131, the switch 120 is open. When the table is moving in the opposite direction, arbitrarily designated as the reverse direction, to its destination, a switch 120′ which corresponds to the switch 120 and which is operated by a cam 122′ on the shaft 126 is actuated to control the solenoid.

The switch 120 or 120′ is effective to energize the solenoid 100 only after the coarse potentiometer indicates that the table 10 has arrived at a preselected coarse position. Consequently, the switch 120 or 120′ is ineffective to effect energization of the solenoid 100 until the bridge including the coarse potentiometer 122 is balanced. At this time, the switch 120 or the switch 120′ will be effective to energize the solenoid 100 to lift the lever 101 and project the pawl 50 into engagement with a pair of adjacent pegs 15 and cause movement of the pawl carrier 51 with the table 10. This movement will be in the direction of movement of the table 10 and will continue until the rotary gauge effects a stopping of the main drive motor. Upon the stopping of the main drive motor, the motor 80 will operate to return the pawl carrier 51 to a "home" position. The pawl 50, of course, will be retracted before the return of the pawl carrier.

Two switches 120, 120' are provided for controlling the energization of the pawl solenoid 100 since the pawl in the illustrated embodiment has a width in its engagement with the pegs which is one-half the distance between the pegs. Consequently, when the pawl carrier 51 is to move in the forward direction with the table from a coarse position, the carrier must be positioned so that a peg immediately rearwardly of the pawl is in engagement with the projected pawl at the coarse position. While, if the carrier is to be moved rearwardly with the table from the coarse position to the final position, the pawl carrier 51 must be shifted to cause the forward side of the pawl 50 to engage a peg immediately forward of the projected pawl when the table is at the coarse position. Consequently, the pawl carrier has a forward home position and a reverse home position from which it is moved to gauge the movement of the table from the "home" position, with the latter being forwardly of the forward "home" position. The "home" switches 90, 91 are offset from each other and the switch 90 is effective to cause return of the table when it has been displaced in a forward direction, and the switch 91 is effective to cause a return of the carrier when the carrier has been displaced in a rearward direction. Moreover, the switches 90, 91 will operate to assure that the pawl carrier 51 is in the proper "home" position at the start of a positioning operation.

The pawl 50 has tapered flats 50a, 50b to facilitate proper engagement with the pegs when the pawl is projected on arrival of the table at a preselected coarse position.

Figure 5:
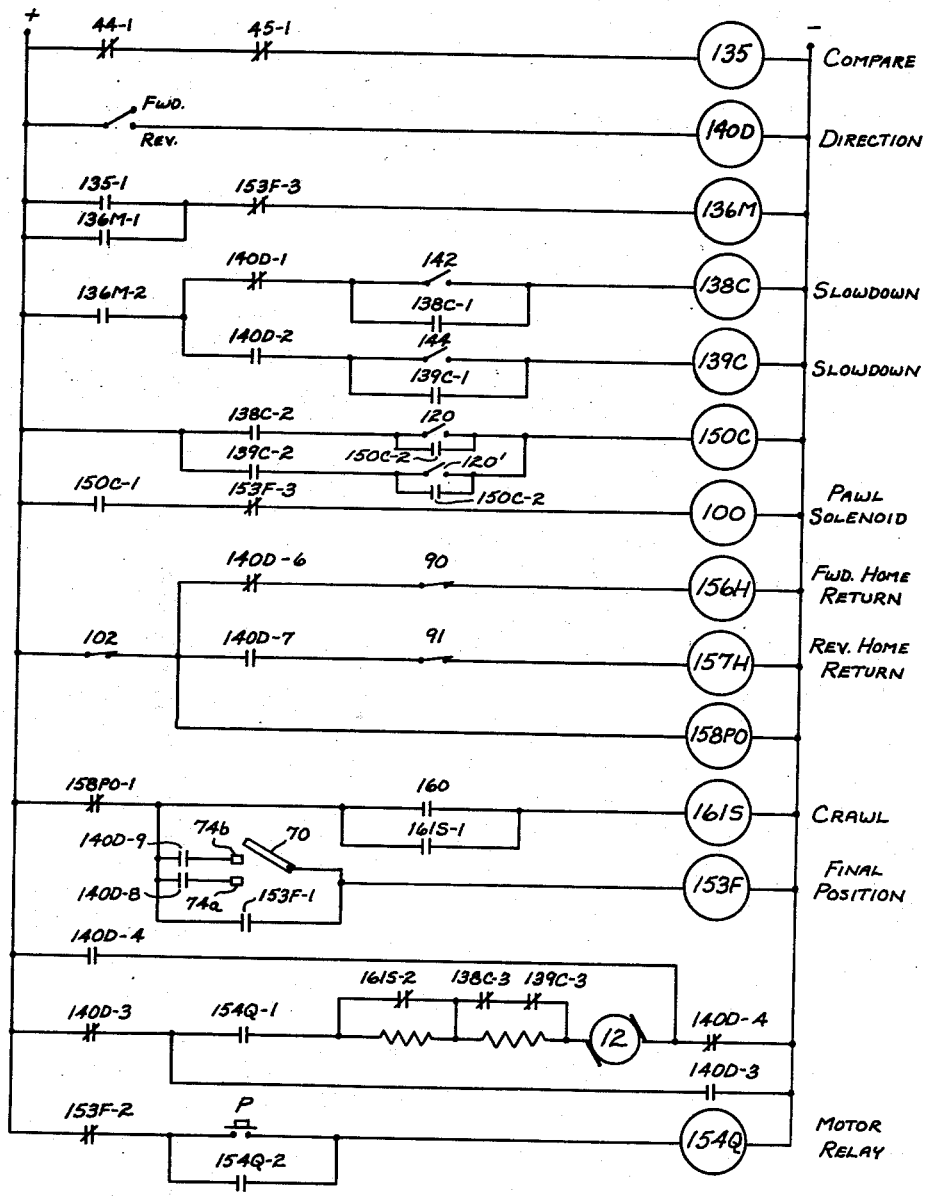
FIG. 5 is a control circuit for the mechanism.

The control circuit of the positioning mechanism is shown in FIG. 5 and, as shown therein, a relay 135 is energized whenever both the forward relay 44 and the reverse relay 45 are de-energized to indicate that the table 10 is at, or approaching a coarse position indicated by the bridge 22. The forward relay and the reverse relay have contacts 44–1 and 45–1 which are normally closed and which are in the circuit for energizing the relay 135. When the relay 135 is energized, it closes its contacts 135–1 in a circuit for energizing a relay 136M having normally open contacts 136M–1 and 136M–2. The closing of contacts 136M–1 completes a self-holding circuit about the contact 135–1 to hold the relay 136M energized. The closing of contacts 136M–2 conditions a circuit for effecting energization of either a slow-down relay 138C or a slow-down relay 130C, depending upon the direction of movement of the table. If the table is moving in one direction to the destination position, the contacts 136M–2 complete a slow-down circuit through normally closed contacts 140D–1 of a direction relay 140D and through a limit switch 142 to energize relay 138C. If the table is moving in the opposite direction, the closing of contacts 136M–2 completes a slow-down circuit through normally open contacts 140D–2 of the direction relay 140D and a limit switch 144 to energize relay 139C. The direction relay 140D also has contacts 140D–3, 140D–4 in the armature circuit for energizing the motor 12. If the relay is de-energized, the contacts 140D–3 are effective to operate the motor in the forward direction; if energized, the contacts 140D–4 are effective to operate the motor in the reverse direction. The relay 140D may be controlled manually or may be controlled from the coarse bridge circuit. For simplification, the relay 140D is shown as being controlled manually to indicate the direction of movement to the position.

The limit switches 142 and 144 may be switches which are operated by cams on the shafts 123, 127, respectively. The cams correspond in configuration to the cam 122 and have been given the reference numerals 147, 148. The cams hold the switches 142, 144 open but close the limit switches 142 and 144 once for each revolution of the shaft. Preferably, the switches are closed when the table is at a coarse position. Consequently, when the comparison has been made, indicating arrival at the preselected coarse position and the switches closed, one of the relays 138C, 139C will be energized. The relay 138C or relay 139C effects slowdown of the motor 12 by opening contacts 138C–3 or 139C–3 to insert resistance into the armature circuit of the motor to cause the continued operation of the motor 12 to be at a reduced rate. The relays 138C, 139C have contacts 138C–1, 139C–1, respectively, which form holding circuits about the switches 142, 144, respectively. The relays 138C, 139C also have contacts 138C–2 and 139C–2 connected in parallel circuits for energizing a relay 150C. The contacts 138C–2 effect energization of the relay 150C through the limit switch 120, and the contacts 139C-2 effect energization of the relay 150C through the switch 120'. The relay coil 150C operates normally closed contacts 150C–1 which effect energization of the solenoid 100 to project the pawl 50. Consequently, it can be seen that as the table 10 arrives at the coarse position selected by the coarse bridge and a comparison is made, the closing of contacts 135–1 effects the energization of the relay 136M which, in turn, effects energization of one of the relays 138C, 139C to effect a slowdown and to effect energization of the relay 150C for energizing the pawl solenoid. The relay 150C has self-holding contacts 150C–2 in parallel with each switch 120, 120' to effect a holding circuit for the relay 150C.

The relays 44, 45 may be de-energized over a range of table movement as the bridge approaches a balanced condition, depending on the sensitivity of the circuitry and the minimum voltage level necessary to maintain the relays energized. Therefore, the energized one of the relays 44, 45 may drop out before actual balance occurs. This is not undesirable as long as the drop-out does not occur early enough to effect operation at a coarse position in advance of the selected coarse position. In fact, when the relays 44, 45 drop out in advance of the selected coarse position, the slow-down switches 142, 144 may be closed to effect slowdown in advance of arrival at the preselected coarse position so that the table is traveling at a slow speed when the switch 120 is actuated to effect a projecting of the pawl 50. Thus, the coarse bridge 22 will give an approximate indication of the preselected coarse position in advance thereof and condition the switch 120 to be effected when actuated precisely at the coarse position to project the pawl 50 at the proper time.

The motor 12 continues to operate at a slow rate after engagement of the pawl 50 and the pawl carrier 51 now moves with the table because of the engagement of the pawl 50. The movement of the table will continue until the rotary gauge 70 engages the contact 74a or contact 74b depending upon the direction of movement. The direction relay 140D has contacts 140D–8, 140D–9 which operate to select the proper contact for the direction of movement. The contacts 140D–8 are normally closed and render the contact 74a effective when the table is moving in a forward direction and the contacts 140D–9 are normally open and render the contact 74b effective when the table is being positioned in the reverse position. When the gauge 70 contacts the selected one of the contacts 74a, 74b, the relay 153F is energized. The relay 153F is the final destination relay and has a normally open contact 153F–1 which forms a holding circuit around the contacts 152AS–1 and normally closed contacts 153F–2 in the circuit for energizing a motor stop-start relay 154Q. The de-energization of the relay 154Q opens the armature circuit of the motor 12 by opening its contacts 154Q–1 and this stops the table drive motor. The relay 154Q may have normally closed contacts for energizing a brake for the motor and table when the relay is de-energized. The relay 154Q also has self-holding contacts 154Q–2, in parallel with a pushbutton switch P for energizing the relay 154Q, which are opened when the relay is de-energized.

The final destination relay 153F also has normally closed contacts 153F-3 in the circuit for energizing the pawl solenoid 100, and when these are open, the pawl solenoid is de-energized and the pawl 50 retracted.

The retraction of the pawl 50 closes the switch 103 and this completes a circuit for energizing either a relay 156H or a relay 157H. If the motor 12 has operated in the forward direction to move the table to its final position, the relay 156H is energized through the switch 103 and the normally closed contacts 140D-6 of the relay 140D, and the "home" switch 90 which is closed since the pawl carrier 51 is displaced from its "home" position. If the motor has operated in the reverse direction, the relay 157H is energized upon the closing of the pawl switch 102 through a circuit including the normally open contacts 140D-7 of the relay 140D and the switch 91 which is now closed and due to the fact that the pawl carrier is displaced from its "home" position. The relays 156H, 157H control the energization of the motor 80 and its direction of operation in the one direction to return the pawl carrier 51 to its "home" position. The return of the pawl carrier also returns the rotary gauge. If the relay 157H is energized, the motor 80 is operated in the opposite direction to return the pawl carrier to its "home" position. When the pawl carrier 51 reaches its "home" position, the switch 90 or the switch 91 is opened to de-energize the motor 80.

The closing of the switch 103 upon retraction of the pawl energizes a relay 158PO to open its contacts 158PO-1 in the circuit for energizing the final destination relay 153F to cause the de-energization of this relay. The de-energization of relay 153F conditions the circuit for energizing the motor start-stop relay 154Q to be energized when a switch therein controlled manually or automatically is closed to effect movement of the table. The de-energization of the final relay 153F also opens contacts 153F-3 in the circuit for energizing the relay 136M to break the circuits for energizing the relays 138C, 139C and, in turn, the circuits for energizing the relay 150C to recondition the circuit for the next positioning operation.

The circuits for energizing the relays 156H, 157H will also assure that the pawl carrier is in its proper "home" position at the beginning of the positioning operation. If the positioning is to be done in a reverse direction and the prior movement had been in a forward direction, the pawl carrier 51 would be in the forward home position determined by the switch 90 which is rearward of the home position for the reverse direction as determined by the switch 91 and, therefore, the switch 91 would be closed. Consequently, when direction relay 140D is energized to select operation in a reverse direction, a circuit will be made through the switch 103, contacts 140D-7 and switch 91 to energize relay 157H to effect operation of the motor 80 to move the pawl carrier forwardly to the reverse home position where the switch 91 is opened. Similarly, the switch 90 is closed when the pawl carrier is in its reverse home position and when the forward direction is selected, a circuit is made through the switch 103 and the contacts 140D-6 to move the pawl carrier to its forward home position where the switch 90 is opened.

When the table is to be moved forwardly to a position, for example, the 4.6-inch position from the datum plane, the coarse bridge will cause the pawl to project when the table is at the 4-inch position. While, if the table is moving in the reverse direction, the pawl should be projected when the table is at the 5-inch position. Preferably, the direction relay 140D has contacts which operate to change the balance point of the coarse bridge by switching resistance in the bridge so that when operating in the reverse direction, the balance is achieved at a position one increment forwardly of the balance position when the table is moving forwardly. When the table is to be moved to the 4.6-inch position, the spider is set to provide $6/10$ of an inch movement in a forward direction from the 4-inch coarse position and to stop the table at the 4.6-inch position. When the pawl is projected at the 4-inch position, the gauging member of the switch mechanism AS will rotate through an arc corresponding to $6/10$ of an inch movement. If the same setting is maintained on the spider but if the table is approaching the 4.6-inch position in a reverse direction, the pawl will be projected at the 5-inch position, and the gauging member will be rotated in the opposite direction to the 4.6-inch position to provide $4/10$ of an inch movement from the 5-inch coarse position. Consequently, if a full revolution of the spider represents one increment, then only a single scale is required as is shown in FIG. 3A, and the spider need only be set to the absolute fraction of an inch. It can be seen that by providing a rotary gauge member 70 and rotating the latter in a direction dependent upon the direction of positioning, a simplified setting mechanism is provided. This is particularly advantageous when the spider is being set automatically with a servomotor as is commonly done when a tape control is used. In the case of tape control, the direction of positioning can be indicated on the tape and the absolute inch position used to indicate the position to which the table is to be moved. There is no need to provide the complement of the fractional part of the movement or to make other adjustments to adjust the direction of movement of the table to the position, as will be clear to those skilled in the art from the foregoing description.

From the foregoing, it can be seen that the above circuit effects a control of the table drive motor so that the table 10 is first positioned to a coarse position where the pawl 50 is engaged between two pegs 15 to cause movement of the pawl carrier 51 with the table 10 and after the pawl carrier 51 has been moved a preselected distance to effect rotation of the rotary gauge membe 70 to a preselected amount, the drive motor 12 is stopped.

The "home" position of the pawl carrier 51 must be very precise and for this reason the frame 54 is made adjustable relative to the support plate 55. The frame 54 may be adjusted along the path of movement of the table 10 by rotating a lead screw 160 which is journaled in blocks 161 on the support plate 55 and which threads through a block 162 fixed to the frame 54. The adjusting of the frame 54 relative to the table 10 causes adjustment of the whole positioning mechanism including the switch mechanism AS, the motor 80, and the pawl carrier 51 as a unit.

The rotary gauge member 70 may engage a contact in advance of the contacts 74a or 74b to effect a second slow-down of the motor for driving the movable member 10 so that the final positioning is done at a crawl speed. This contact may be adjustably mounted on the spider 78 or may be on a separate adjustable spider and is shown in the circuit diagram of FIG. 4 as a contact 160 for energizing a relay 161S having self-holding contacts 161S-1 for normally closed contacts 161S-2 in the armature circuit of the motor 12. The contacts 160 energize relay 161S through the normally closed contacts 158PO-1 of the relay 158PO. Consequently, when the relay 158PO is energized to de-energize the final destination relay 153F, the relay 161S is also de-energized.

The operation of the foregoing circuit may be summarized as follows: The coarse bridge 22 is set by energization of a particular combination of relays 36, 37, 38, 39, 40 to select the coarse position immediately in advance of the destination position for the table 10. The fine positioning mechanism is set by adjusting the knob 77 to offset the contacts 74a, 74b the desired distance from the rotary gauge member 70. After this selection has been made, a pushbutton switch P is depressed to energize the motor start-stop relay 154Q. The relay 154Q closes its contacts to energize the motor 12 and effect operation thereof in the direction necessary to move the table 10 to the destination position. The direction of operation is determined by the setting of relay 140D. The motor will operate until the coarse bridge 22 approaches a balanced condition and, at this time, one of the relays 44, 45 which has been energized will be de-energized to effect energization of the comparison relay 135. Energization of the comparison relay 135 conditions the slow-down circuits and the pawl energizing circuits by energizing the relay 136M. When the table arrives at the coarse position, the closing of the switch 120 or 120' will energize the pawl solenoid relay 100 to engage the pawl with the table 10. The movement of the pawl carrier 51 with the table 10 will cause rotation of the lead screw 58 and of the gauge member 70. After the gauge member 70 has moved the preselected distance, it will engage the contacts 74a or 74b to effect energization of the relay 153F to de-energize the motor stop-start relay 154Q and the pawl solenoid 100. Retraction of the pawl 50 sets up a circuit for energization of the motor 80 to return the pawl carrier to its "home" position. When the pawl carrier reaches its "home" position, the motor 80 is stopped by the operation of the switches 90, 91.

While the preferred embodiment of the present invention has been described in considerable detail, further modifications, constructions, and arrangements will be apparent to those skilled in the art and it is hereby our intention to cover all such constructions, modifications, and arrangements which fall within the ability of those skilled in the art and within the spirit and scope of the appended claims.

Having described our invention, we claim:

1. In a system for positioning a movable member, presettable control means for measuring the movement of said member from a preselected one of a plurality of coarse positions and presettable to stop the movement of said member after a desired movement of said member from the preselected coarse position comprising a gauge member and means for driving said gauge member to move the latter proportionately to the movement of the movable member, second control means actuated as said movable member arrives at each coarse position rendering said presettable control means effective, and third control means for conditioning said second control means to render said presettable control means effective only as the movable member arrives at a preselected coarse position.

2. In a system for positioning a movable member, drive means for moving said member through a plurality of predetermined coarse positions to a destination position or a selectable distance from a preselected coarse position, a measuring member operable to move with said movable member when the latter is at a coarse position, first control means actuated as said movable member arrives at said coarse positions for effecting movement of said measuring member by said movable member when said movable member is at any of said coarse positions and comprising a part for movement with said measuring member and engageable with said movable means, second control means for conditioning said first control means to be operative to effect movement of said measuring member with said movable member at said preselected one only of said coarse positions, and means responsive to a selectable movement of said measuring member to stop the operation of said drive means.

3. In a system for positioning a movable member, drive means for moving said member through a plurality of coarse positions to a final destination offset a selectable distance from one of said plurality of coarse positions and through which the member moves, a second member supported for movement with said member and connectable to said movable member for movement therewith at any of said coarse positions, a gauging member for measuring the movement of said second member, means for rotating said gauging member from said second member comprising a cooperating ball-type lead screw and nut drive interconnecting said members, control means for connecting said second member to said movable member at a preselected one of said coarse positions, and means responsive to a preselectable movement of said gauging member with said movable member to stop said drive means.

4. A positioning system as defined in claim 3 wherein said control means comprises a switch to be actuated at each coarse position and means for actuating said switch at each coarse position, comprising a cam and means for rotating said cam one revolution by movement of said member through a distance equal to the distance between adjacent coarse positions.

5. In a positioning system, a movable member movable along a path having a plurality of coarse positions to a destination offset in the direction of movement from a particular one of said coarse positions, drive means for moving said movable member along said path, a second member supported for movement along said path and having a home position, a movable pawl engageable between said members at any of said coarse positions when said second member is in said home position to effect movement of said second member with said movable member, control means for preselecting a particular coarse position at which said pawl is engaged and for effecting engagement at the selected coarse position only, a rotary gauging member for measuring the movement of said second member from its home position and stopping said drive means after a preselectable movement, and a ball-type lead screw and nut connection interconnecting said gauging member and said second member in driving relationship.

6. In a system for positioning a movable member, drive means for moving said member through a plurality of coarse positions to a final destination offset a selectable distance from one of said plurality of coarse positions and through which the member moves, a second member supported for movement with said member and connectable to said movable member for movement therewith at any of said coarse positions, a gauging member for measuring the movement of said second member, means for rotating said gauging member from said second member comprising a cooperating ball-type lead screw and nut drive interconnecting said members, control means for connecting said second member to said movable member at a preselected one of said coarse positions, and means responsive to a preselectable movement of said gauging member with said movable member to stop said drive means, said means for preselecting the particular coarse position at which said second member is to be connected to said movable member comprises second control means actuatable at each coarse position for effecting the interconnection of said movable and second members and presettable means for conditioning said second control means to be effective only as said movable member arrives at the preselected coarse position.

7. In a positioning system, a movable member movable along a path having a plurality of coarse positions to a destination offset in the direction of movement from a particular one of said coarse positions, drive means for moving said movable member along said path, a second member supported for movement along said path and having a home position, a movable pawl engageable between said members at any of said coarse positions when said second member is in said home position to effect movement of said second member with said movable member, control means for preselecting a particular coarse position at which said pawl is engaged and for effecting engagement at the selected coarse position only, a rotary gauging member for measuring the movement of said second member from its home position and stopping said drive means after a preselectable movement, a ball-type lead screw and nut connection interconnecting said gauging member and said second member in driving relationship, said means for preselecting the particular coarse position at which said second member is to be connected to said movable member comprising second control means actuatable at each coarse position for effecting the interconnection of said movable and second members, and presettable means for conditioning said second control means to be effective only as said table arrives at the particular coarse position.

8. A positioning system as defined in claim 7 wherein said control means comprises a switch to be actuated at each coarse position and means for actuating said switch at each coarse position, comprising a cam and means for rotating said cam one revolution by movement of said member through a distance equal to the distance between adjacent coarse positions.

9. In a system for positioning a movable member, drive means for moving said member through a plurality of coarse positions to a final destination offset a selectable distance from one of said plurality of coarse positions and through which the member moves, a second member supported for movement with said member and connectable to said movable member for movement therewith at any of said coarse positions, a gauging member for measuring the movement of said second member, means for rotating said gauging member from said second member comprising a cooperating ball-type lead screw and nut drive interconnecting said members, control means for connecting said second member to said movable member at a preselected one of said coarse positions, and means responsive to a preselectable movement of said gauging member with said movable member to stop said drive means, and means responsive to the operation of said gauging member to stop said drive member for disconnecting said second member and said movable member and returning said second member to its home position.

10. In a positioning system, a movable member movable along a path having a plurality of coarse positions to a destination offset in the direction of movement from a particular one of said coarse positions, drive means for moving said member along said path, a second member supported for movement along said path and having a home position, a movable pawl engageable between said members at any of said coarse positions when said second member is in said home position to effect movement of said second member with said movable member, control means for preselecting a particular coarse position at which said pawl is engaged and for effecting engagement at the selected coarse position only, a rotary gauging member for measuring the movement of said second member from its home position and stopping said drive means after a preselectable movement, a ball-type lead screw and nut connection interconnecting said gauging member in driving relationship, and means responsive to the operation of said gauging member to stop said drive member and operating said pawl to disconnect said second member and said movable member and to return said second member to its home position.

11. In a system for positioning a movable member, drive means for moving said member through a plurality of predetermined coarse positions to a destination position or a selectable distance from a preselected coarse position, a measuring member operable to move with said movable member when the latter is at a coarse position, first control means actuated as said movable member arrives at said coarse positions to effect movement of said measuring member by said movable member, second control means for conditioning said first control means to be operative to effect movement of said measuring member by said movable member at said preselected one only of said coarse positions, and means responsive to a selectable movement of said measuring member to stop the operation of said drive means, slowdown means for changing the rate at which said drive means drives said movable member including further control means actuatable as said movable member arrives at said coarse position to change the speed of said drive means, and means responsive to said second control means for rendering said slowdown means effective as said movable member arrives at a preselected coarse position.

12. In a positioning system, a movable member movable along a path having a plurality of coarse positions to a destination offset in the direction of movement from a particular one of said coarse positions, drive means for moving said movable member along said path, a second member supported for movement along said path and having a home position, a movable pawl engageable between said members at any of said coarse positions when said second member is in said home position to effect movement of said second member with said movable member, control means for preselecting a particular coarse position at which said pawl is engaged and for effecting engagement at the selected coarse position only, a rotary gauging member for measuring the movement of said second member from its home position and stopping said drive means after a preselectable movement, and a ball-type lead screw and nut connection interconnecting said gauging member and said second member in driving relationship, and slowdown means for changing the rate at which said drive means drives said movable member including further control means actuatable as said movable member arrives at said coarse positions to change the speed of said drive means, and means responsive to said presettable means for rendering said slowdown means effective as said movable member arrives at said preselected coarse position.

13. In a positioning system including a movable member to be positioned and drive means for moving said member, a rotary gauge member movable a preselectable distance from a zero position to stop said drive means, a carrier, means for connecting said carrier to said movable member at a predetermined position of the latter to cause said carrier to move linearly with said movable member and a ball-type lead screw and nut connecting said carrier and gauge member to rotate the latter as said carrier moves linearly.

14. In a positioning system as defined in claim 13 wherein said movable member has a plurality of equally spaced predetermined coarse positions at which said carrier is connectable to said movable member and a plurality of pins equally spaced along the line of movement a distance equal to the distance between coarse positions and said means for connecting said carrier and movable member comprises a pawl projectable between adjacent pins.

15. In a positioning system including a first movable member and drive means for moving said member relative to a plurality of equally spaced coarse positions to a destination position offset from a preselected one of the coarse positions, a second movable member supported for movement adjacent said first movable member, a plurality of pins on one of said members and equally spaced from each other in the direction of movement, a pawl on the other of said members projectable between said pins to effect movement of said second movable member with said first movable member, a rotary gauge member, a ball and lead screw connection interconnecting said second movable member and gauge member to effect rotation of said gauge member on movement of said second movable member, control means responsive to a presettable movement of said gauge member to stop said drive means, second control means for projecting said pawl between adjacent ones of said pins and actuatable at each of said coarse positions, and third control means presettable to render said second control means effective at a preselective one of said coarse positions.

16. A system as defined in claim 15 wherein said second control means comprises a cam driven with said first movable member and switch means actuated thereby at each coarse position.

17. In a system for positioning a movable member, drive means for moving said member through a plurality of predetermined coarse positions to a destination position or a selectable distance from a preselected coarse position, a measuring member operable to move with said movable member when the latter is at a coarse position, first control means actuated as said movable member arrives at said coarse position for effecting movement of said measuring member by said movable member when said movable member is at any of said coarse positions comprising a switch actuated at each coarse position and means for actuating said switch at each coarse position comprising a cam, and means for rotating said cam one revolution by movement of said movable member through a distance equal to the distance between adjacent coarse positions, second control means for conditioning said first control means to be operative to effect movement of said measuring member with said movable member at said preselected one only of said coarse positions, and means responsive to a selectable movement of said measuring member to stop the operation of said drive means.

18. In a system for positioning a movable member, drive means for moving said member through a plurality of coarse positions to a destination position which is a predeterminable distance from a preselected coarse position, a measuring member connectable to and movable by said movable member when the latter is at the preselected coarse position, control means actuatable as said movable member arrives at said preselected coarse position to effect connection of said measuring member and said movable member to provide for movement of said measuring member by said movable member as said movable member moves from said preselected coarse position, and means responsive to a selectable movement of said measuring member by said movable member from said preselected coarse position to stop the operation of said drive means.

19. A positioning system as defined in claim 18 wherein said measuring member includes a movable carriage and gauging means operatively associated with said carriage for measuring the movement of said carriage from the preselected coarse position and for stopping said drive means after a preselectable movement, and said control means comprises cooperating elements engageable as said movable member is at said preselected coarse position to interconnect said carriage and said movable member.

20. In a system for positioning a movable member, drive means for moving said member through a plurality of coarse positions to a destination position which is a predeterminable distance from a preselected coarse position, a measuring member connectable to and movable by said movable member when the latter is at the preselected coarse position and a gauging means operatively associated with said measuring member for measuring the movement of said measuring member by said movable member and for stopping said drive means after a predeterminable movement, control means comprising an element connected to said measuring member and cooperating elements directly connected to said movable member engageable to connect said movable member to drive said measuring member, operating means actuated as said movable member arrives at each of said coarse positions for engaging said elements, and additional means conditioning said operating means to effect engagement of said elements when said movable member is at said preselected one only of said coarse positions.

21. In a system for positioning a movable member, reversible drive means for selectively moving said movable member in opposite directions through a plurality of coarse positions to a destination position which is a predeterminable distance from a preselected coarse position, a measuring member connectable to and movable by said movable member when the latter is at the preselected coarse position comprising a movable carriage and a gauging means operatively associated with said carriage for measuring the movement of said carriage from the preselected coarse position and for stopping said drive means after a predeterminable movement, control means comprising an element connected to said measuring member and cooperating elements directly connected to said movable member engageable to connect said movable member to said measuring member, said elements having first cooperating surfaces for effecting a drive in one direction and second cooperating surfaces for effecting a drive in an opposite direction, said first and second cooperating surfaces engaged when said elements are disposed in driving relationship and means for rendering said elements engageable when said movable member is at said preselected coarse position.

References Cited by the Examiner

UNITED STATES PATENTS

| | | | |
|---|---|---|---|
| 2,007,180 | 5/35 | Doran et al. | 90—16 |
| 2,134,743 | 11/38 | Strawn | 90—16 |
| 2,748,665 | 6/56 | Senn. | |
| 2,985,038 | 5/61 | Tandler et al. | 74—815 |

WILLIAM W. DYER, Jr., *Primary Examiner.*